Figure 1A:
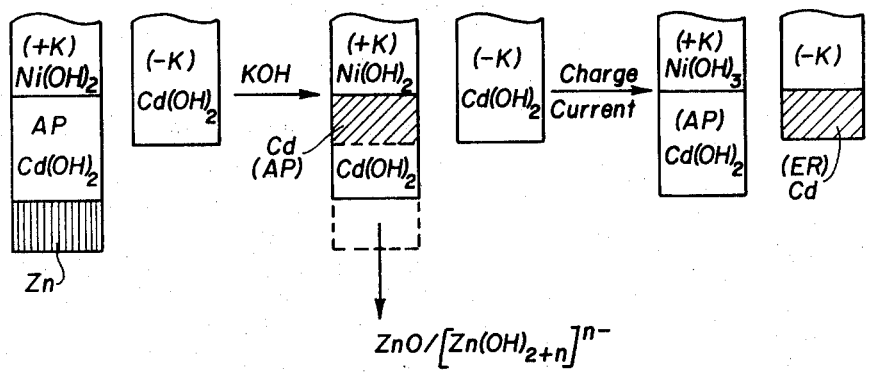

United States Patent
Krämer et al.

[11] 3,847,668
[45] Nov. 12, 1974

[54] ALKALINE ACCUMULATOR OPERATED IN GAS-TIGHTLY SEALED CONDITION

[75] Inventors: Günter Krämer; Helmut Glaser, both of Kelkheim/Ts., Germany

[73] Assignee: Varta Aktiengesellschaft, Kelkheim/Taunus, Germany

[22] Filed: Nov. 14, 1972

[21] Appl. No.: 306,277

[30] Foreign Application Priority Data
Nov. 15, 1971  Germany............................ 2156554

[52] U.S. Cl...................... 136/6 G, 136/24, 136/28, 136/30
[51] Int. Cl. .......................................... H01m 35/00
[58] Field of Search..... 136/6 GC, 6 G, 6 R, 26–31, 136/20, 179, 24, 3

[56] References Cited
UNITED STATES PATENTS

| | | |
|---|---|---|
| 3,174,878 | 3/1965 | Peters............................... 136/28 X |
| 3,066,178 | 11/1962 | Winkler................................ 136/24 |
| 3,351,490 | 11/1967 | Von Doehren.................... 136/24 X |
| 2,934,581 | 4/1960 | Dassler............................. 136/28 X |
| 3,170,819 | 2/1965 | Abramson......................... 136/28 X |
| 3,558,356 | 1/1971 | Jost................................... 136/28 X |
| 3,174,879 | 3/1965 | Stanimirovitch.................. 136/28 X |
| 3,595,697 | 7/1971 | Dickfeldt et al. ................ 136/6 GC |

Primary Examiner—Anthony Skapars
Attorney, Agent, or Firm—Herbert L. Lerner

[57] ABSTRACT

An accumulator of the alkaline type permanently sealed against gas and moisture includes a negative electrode having electronegative active matter, a positive electrode having an excess of chargeable negative matter and antipolar matter, and an oxidation product of a reducing agent conductively connected to the positive electrode, the reducing agent being more strongly electronegative than the active matter of the negative electrode.

4 Claims, 2 Drawing Figures

Production of the Discharge Reserve with and without Current Supply; Zn in Both Electrodes.

Production of the Discharge Reserve with Current Supply;
Zn in the Antipolar Matter of the Positive Electrode.

Production of the Discharge Reserve with and without Current Supply;
Zn in Both Electrodes.

ALKALINE ACCUMULATOR OPERATED IN GAS-TIGHTLY SEALED CONDITION

The invention relates to a permanently gas- and moisture-proof sealed alkaline accumulator or storage cell or battery having an excess of chargeable negative matter and an antipolar addition to the positive matter.

In addition to the net or effective positive and negative capacity, gas-tightly sealed accumulators require a charge reserve in the negative electrode in order to ensure overload or overcharge safety, a discharge reserve in the negative electrode to afford heavy current discharges, as well as the latter in combination with an antipolar capacity to ensure pole reversal reliability when the gas-tightly sealed accumulator is used in battery form. The optimum cell layout for gas-tightly sealed cells is such that the negative electrode or electrodes contain more chargeable and also more dischargeable matter in electrochemical equivalents than do the positive electrode or electrodes, and the excess of negative dischargeable capacity is less than the antipolar capacity in the positive electrode.

The charge reserve in the negative electrode insures that when given constructive parameters, such as, negative electrode surface area, exposed negative metal surface area, electrode spacing, type of separator, electrolyte volume and density are maintained, the oxygen, which develops at the positive electrode during charging and discharging, is reduced to hydroxide ions, at the partially charged negative electrode at the $Cd/Cd(OH)_2$ potential. Since the charge condition of the negative electrode or electrodes, which still contain chargeable matter, no longer changes, the separation conditions for hydrogen are not attained, and the development of hydrogen is prevented. The accumulator can be overloaded or overcharged without pressure build-up.

The discharge reserve in the negative electrode is necessary so that the positive electrode retains its capacity-limiting properties even for heavy current discharge. Because of the presence thereof, the onset of oxygen development is postponed during low discharge, until the antipolar matter is at least partly reduced, in the positive electrode which has been reversed in polarity in the interim.

The antipolar matter in the positive electrode during polarity reversal, as well as the charge reserve in the negative electrode during overcharging, prevent the development of hydrogen and maintain the potential of the reversely poled, positive electrode at $Cd/Cd(OH)_2$ potential, which is advantageous for oxygen reduction.

The formation of an active discharge reserve in the negative material or electrode requires considerable expense, be it during mass production, or during electrical processing of the electrodes or of the cells when they are as yet not tightly sealed.

During mass production, one usually employs a method which basically stems from British Pat. No. 9,964 of 1910 to Estelle. To this end, cadmium is precipitated as spongy metal cathodically with defined current density from appropriately composed baths, then washed, dried and ground. The resultant partly oxidized products have a varying content of metallic cadmium and require a special selection process in the event they are to be used in gas-tight cells. The electrical pre-treatment of the individual electrodes which serves for activating and purifying the same can fundamentally be controlled so that the negative electrode retains a residue of metallic cadmium. No one was able to realize heretofore, however, that this metal residue was obtainable reproductively by washing and drying.

In order to produce the required metal residue in the negative electrode, costly formation processes must be carried out with the cells that have not as yet been tightly sealed. Often these methods require an excess of electrolyte which must be removed by mechanical means before the housing is sealed. In some methods, an after-treatment with oxygen is provided in order to re-oxidize excessive cadmium metal. As the foregoing brief comment regarding open formation would lead one to expect the reproducibility of the outlined measures is unsatisfactory.

The cell formation in the open state therefore represents a true bottle neck within a largely automated production process, and the elimination thereof is the object of the present invention.

In U.S. Pat. No. 3,208,880 to H. Bode, which is assigned to the assignee of the instant application, there is disclosed an alkaline accumulator or storage battery wherein the negative discharge reserve is produced through the introduction of metallic zinc into the negative electrode, or through conductively connecting a zinc electrode to the negative electrode.

It is an object of the present invention to dispense with the active matters or masses which are produced by a complicated and expensive electrochemical method, and to develop an alkaline accumulator wherein oxide compounds produced in a purely chemical manner are used as masses or matters.

With the foregoing and other objects in view, there is provided in accordance with the invention, in an accumulator of the alkaline type permanently sealed against gas and moisture, a negative electrode having electronegative active matter, a positive electrode having an excess of chargeable negative matter and antipolar matter, and an oxidation product of a reducing agent conductively connected to the positive electrode, the reducing agent being more strongly electronegative than the active matter of the negative electrode.

In accordance with a further feature of the invention, the reducing agent is brought into conductive connection with the antipolar matter or mass of the positive electrode, it being found to be particularly expedient to admix the reducing agent in powder form to the antipolar matter or mass of the positive electrode. An element from the group consisting of selenium, tellurium, tin, iridium, molybdenum, tungsten, vanadium, gallium, germanium, chromium, manganese, silicon, boron and aluminium is suitable as the reducing agent. It was found to be particularly advantageous, when using cadmium hydroxide or oxide for the antipolar matter or mass, to employ tin as reducing agent. The quantity of the oxidation product, in electrochemical equivalents, is at most equal to the added quantity of antipolar matter or mass, in accordance with a further feature of the invention.

If for example, zinc is added to the antipolar matter or mass as a powder, the mixed matter or masses thereby obtained are compressed in a conventional manner into tablets or filled into pocket strips. If a mass of cadmium oxide, which is relatively low in carbonate impurities, is used, the de-carbonatization treatment in hot potassium hydroxide can be dispensed with. The electrodes can be installed in dry state. The electrolyte is added in metered or dosed quantities, the reactions which are important for the method of the present invention:

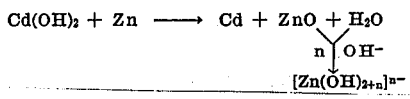

as well as the preceding hydration:

$$CdO + H_2O \longrightarrow Cd(OH)_2$$

when cadmium oxide is employed as starting substance, it should be considered when determining the electrolyte quantity and the electrolyte concentration.

Naturally, the oxidation products of the reducing agent should not have an adverse effect upon the other functions of the accumulator. It is known that zinc hydroxide and zinc oxide as well as zinc cations do not have an adverse effect upon the electrical characteristics of the nickel-oxide/cadmium accumulator.

In the method of producing the accumulator of the invention a quantity of cadmium hydroxide or oxide, which is equivalent to the added zinc component of the antipolar matter or mass, is reduced to metallic cadmium. When the reducing agent is added to the antipolar matter or mass of the positive electrode, the cadmium metal component, which was formed therein through a change in the charge effects for the dense or open charge, a preliminary or preceding charge of the negative electrode which produces the discharge reserve in the negative electrode. If a uniform matter or mass is desired for the negative electrode and the antipolar addition, it is also possible that, if a reducing agent, such as zinc, for example, is added to both polarities, the reducing agent forms a part of the discharge reserve, in fact the major part, through direct reaction with the negative matter or mass, while the remainder i.e., the part which is equivalent to the zinc content of the antipolar matter or mass, is produced through the preliminary or preceding charge.

Other features which are considered as characteristic for the invention are set forth in the appended claims.

Although the invention is illustrated and described herein as alkaline accumulator operated in gas-tightly sealed condition, it is nevertheless not intended to be limited to the details shown, since various modifications may be made therein without departing from the spirit of the invention and within the scope and range of equivalents of the claims.

Figure 1B:
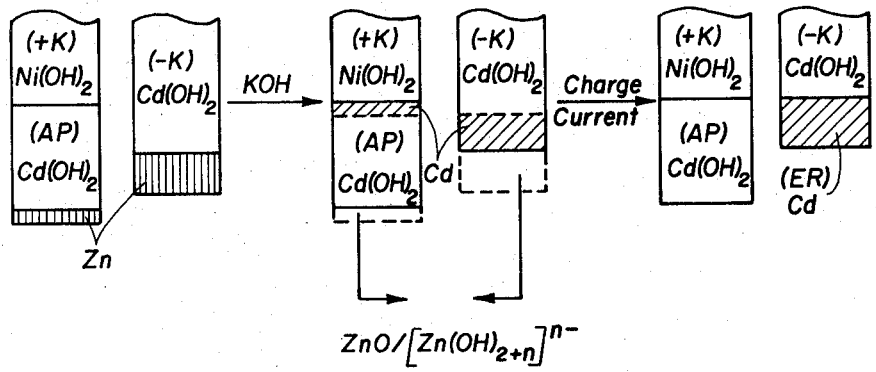

The invention however, together with additional objects and advantages thereof will be best understood from the following description when read in connection with the accompanying drawing in which:

FIGS. 1a and 1b are reaction diagrams for two embodiments of the accumulator constructed in accordance with the invention, wherein, respectively, Zn is present in the positive electrode and in both electrodes.

The following table explains the abbreviations used in the figures for a Ni-Cd accumulator and indicates the capacity and charge distribution in gas-tight, alkaline accumulators.

| | Cell prior to sealing | Direct cell charged | Sealed cell normally discharged | Sealed cell low discharged |
|---|---|---|---|---|
| +K | Ni(OH)$_2$ | NiOOH | Ni(OH)$_2$ | Ni(OH)$_2$ |
| −K | Cd(OH)$_2$ | Cd | Cd(OH)$_2$ | Cd(OH)$_2$ |
| AP | CD(OH)$_2$ | Cd(OH)$_2$ | Cd(OH)$_2$ | Cd(OH)$_2$/Cd |
| ER | Cd | Cd | Cd | Cd(OH)$_2$ |
| LR | Cd(OH)$_2$ | Cd(OH)$_2$ | Cd(OH)$_2$ | Cd(OH)$_2$ |

+K = positive useful or effective capacity
−K = negative useful or effective capacity
AP = antipolar addition in the negative electrode
LR = charge reserve in the negative electrode.

It is apparent from the figures that when the electrolyte is added, the antipolar material or mass e.g., Cd(OH)$_2$, is partly reduced by the reducing agent e.g., zinc, to metallic cadmium. During subsequent charging, this part of the antipolar matter or mass is oxidized initially; during this period, the part which is equivalent to the zinc content of the antipolar mass, is reduced to metallic Cd by the negative matter or mass.

The oxidation product of the reducing agent may be partly dissolved in the electrolyte, and can also be partly added to the antipolar material or mass.

The method of producing the accumulators of the present invention is not limited to mass or matter cells. With certain variations, it is applicable also to gas-tight cells with sinter electrodes. Of course, the zinc cannot be introduced as metal into the pore system of the sinter electrodes. Possible means for realizing a suitable conductive construction are: conductive connection of a zinc sheet, zinc wire mesh or zinc expanded metal with an electrode polarity, the use of a zinc wire or zinc rod as a winding mandrel being also capable of being provided when using round cells with a spirally wound set of electrodes. Another variation or embodiment calls for spraying zinc powder, preferably as a suspension in a volatile, anhydrous suspension agent, upon electrode or electrodes or parts of the same. The suspension can also contain a binder, such as a cellulose derivate, for example, which is effective as an expander for cadmium.

We claim:

1. In an accumulator of the alkaline type permanently sealed against gas and moisture, a negative electrode having a charge reserve and a discharge reserve, a positive electrode containing positive active mass and antipolar matter, and an oxidation product of zinc, said oxidation product being formed by introducing into the accumulator prior to sealing, metallic zinc as a reducing agent conductively connected to said antipolar matter of said positive electrode, which zinc together with said alkaline electrolyte effect reaction and reduction of a portion of the antipolar matter of the positive electrode, said discharge reserve of the negative electrode being formed by charging the electrodes to oxidize said reduced portion of the antipolar matter of the positive electrode and to form simultaneously a discharge reserve of the negative electrode.

2. Accumulator according to claim 1 wherein said oxidation product, in electrochemical equivalents, is at most equal in quantity to the amount of antipolar matter of said positive electrode.

3. Accumulator according to claim 1 wherein the oxidation product of said reducing agent is partly contained in the antipolar matter of said positive electrode.

4. Accumulator according to claim 1 wherein the oxidation product of said reducing agent is partly contained in said electrolyte.

* * * * *